June 19, 1928.  
H. F. SCHMIDT  
VISCOSITY COMPENSATING DEVICE  
Filed Oct. 2, 1925

1,673,953

WITNESSES:

H. F. Schmidt  
INVENTOR  
BY  
ATTORNEY

Patented June 19, 1928.

1,673,953

UNITED STATES PATENT OFFICE.

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA.

VISCOSITY-COMPENSATING DEVICE.

Application filed October 2, 1925. Serial No. 60,131.

My invention relates to fluid pressure systems wherein a fluid of varying viscosity is employed as a pressure medium and wherein the pressure in the system tends to vary with the viscosity of the fluid, and has for its object the provision of means which shall compensate for variations in pressure in the system due to viscosity of the fluid.

Figure 1:
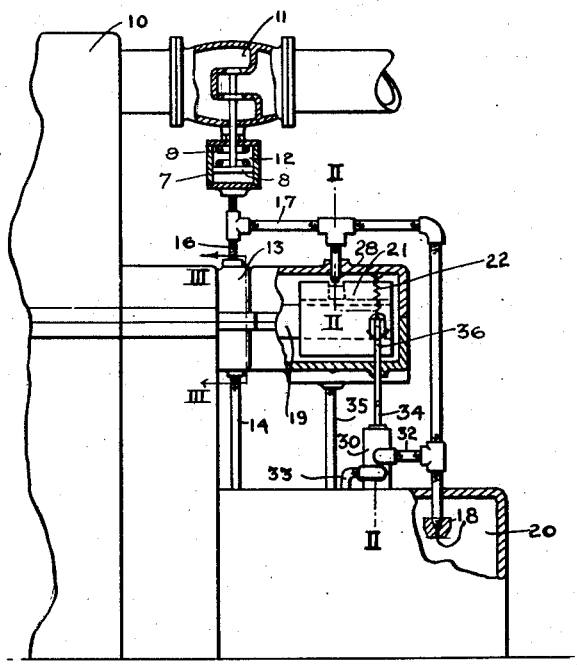
Figure 3:
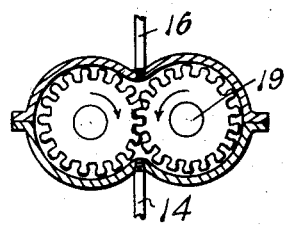
Figure 2:
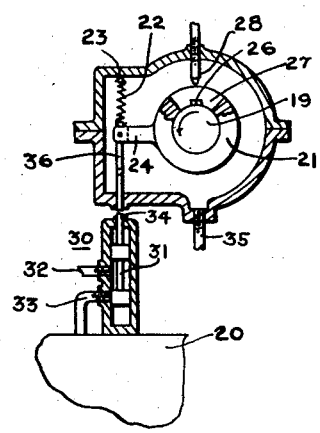

In the accompanying drawings forming a part of this specification;

Fig. 1 is a side elevation, partly in section, of an elastic fluid turbine having my improved apparatus applied thereto; Fig. 2 is a sectional view along the line II—II of Fig. 1 and at right angles thereto; and Fig. 3 is a sectional view along the line III—III of Fig. 1, showing the pump.

In fluid pressure systems wherein fluids of differing viscosities may be employed as the pressure medium or wherein a fluid of which the viscosity varies with the temperature is used, it is well known that the pressure in the system tends to vary with the viscosity of the fluid. The greater the viscosity, the greater is the impelling force which is required to propel a given volume through the system within a given period of time and hence, the greater the pressure. Where the fluid pressure is employed in the operation of governing apparatus for a prime mover and a pressure is desired varying with the speed of the prime mover, the greater the viscosity of the fluid, the greater will be the pressure for a given rate of speed, and difficulties are likely to be encountered unless provision be made to compensate for variations in the viscosity of the fluid. This is especially true where a pump having the characteristic of a positive displacement or a constant volume of fluid per revolution such, for example, as a gear pump, is employed for developing the fluid pressure. My invention is particularly applicable to fluid pressure systems for the operation of governors though it will be apparent throughout the specification that it is capable of other applications.

In accordance with my invention I compensate for the varying viscosity of fluid employed in a fluid pressure system by providing a rotary shaft with a bearing member loosely mounted thereon and afford a continuous supply of the fluid between the bearing member and the shaft. Valve means are provided for varying the flow of fluid through the system and thus varying the back pressure imposed upon the pump, and means are provided for operating the valve means in response to the torque of the bearing member.

Referring now to the drawings for a better understanding of my invention, I show in Fig. 1 at 10 an elastic fluid turbine having an admission valve 11 controlled by a fluid pressure operated governor 12. The fluid pressure operated governor 12 may be of any desired design and is shown herein as including a cylinder 7, a piston 8 connected to the valve 11 and operating in the cylinder 7, and a spring 9 which biases the piston 8 to open the valve. Fluid pressure for operating the governor 12 is developed by a rotary pump 13 driven directly by the turbine 10. The rotary pump 13 may be any one of several types characterized by a positive displacement per revolution and is shown in Fig. 3 as a gear pump, it being understood that, in common with similar type pumps, it develops a pressure in accordance with the resistance to flow through the system which it supplies. At 14 I show a conduit leading to the intake of the pump 13 and at 16 a delivery conduit leading from the pump 13 to the governing apparatus 12. Joining the conduit 16 is a branch conduit 17 terminating at 18 in an orifice of constant area for providing a back pressure on the fluid in the conduit leading to the governor 12. The orifice 18 may conveniently terminate in a reservoir 20 for the fluid of the system. So long as the fluid employed as the pressure medium is of uniform viscosity the orifice 18 is sufficient to insure that the pressure developed by the pump 13 will vary according to the speed of the turbine 10. If, however, the fluid employed varies to any considerable degree in viscosity such, for example, as lubricating oil, upon a high viscosity the pressure for a given speed will be high and with a low viscosity the pressure for a given speed will be low.

I accordingly provide a means for varying the discharge area of the pump 13 in accordance with the viscosity of the fluid. At 19 is shown an extension of the turbine shaft upon which is loosely mounted a sleeve or bearing member 21. In order to restrain the sleeve or bearing member 21 from turning with the shaft 19, I provide a spring 22 secured to the shaft housing at 23 at one end and at the other end to a lever arm 24 mounted on the sleeve or bearing member 21. Provided in the sleeve or bearing member 21, adjacent the shaft 19, is a groove 26 connecting with a port 27 leading to the upper surface of the member 21. Adjacent the port 27 is a small nozzle 28 communicating with the branch conduit 17 and adapted to afford a continuous supply of fluid into the port 27 from whence it passes downwardly into the groove 26 and between the sleeve 21 and shaft 19. It will be seen therefore that the fluid passing through the nozzle 28 acts as a lubricant between the sleeve 21 and the shaft 19 so that the torque transmitted to the sleeve 21 by the shaft 19 varies with the viscosity of the fluid. If the fluid be at its maximum viscosity, the torque transmitted by the shaft 19 to the sleeve 21 will be at a maximum. As the viscosity of the fluid decreases, the torque transmitted to the sleeve or bearing member decreases.

At 30 I show valve means for varying the discharge area from the system, and hence of the pump 13. The valve means 30 comprises a balanced valve 31 communicating between its ends with the conduit 17 through a branch conduit 32 and adapted upon downward movement from the position indicated to communicate with a conduit 33 leading to the oil reservoir 20. The valve member 31 is connected by a stem 34 and a link 36 with the lever arm 24 of the sleeve or bearing member 21. It will thus be seen that upon an increase in torque of the sleeve or bearing member 21, the lever arm 24 is moved downwardly, taking with it the valve 31 and establishing communication between the conduits 33 and 32. Upon a decrease in torque of the sleeve or bearing member 21, the spring 22 pulls the lever 24 upwardly, carrying with it the valve 31, and shutting off communication between the conduits 33 and 32. Fluid supplied to the sleeve or bearing member 21 is returned to the reservoir 20 through a drain conduit 35.

The operation of apparatus made in accordance with my invention is as follows:— Assume first that the turbine is being started and that the fluid within the reservoir 20 is comparatively cold and at its maximum viscosity. The pump 13 displaces a constant volume of fluid per revolution and discharges it into the conduits 16 and 17 and out through the orifice 18. At the maximum viscosity of the fluid the resistance to flow through the system and through the orifice 18 is such that the pressure developed is comparatively high for a given speed of the turbine. Fluid flowing from the nozzle 28 between the bearing 21 and the shaft 19 establishes a film of fluid between said bearing member and said shaft through which torque is transmitted from the shaft to the bearing member. The fluid at a comparatively high viscosity transmits a greater torque to the bearing member 21 and the lever arm 24 is carried downwardly against the tension of the spring 22 and the valve 31 is moved downwardly to open communication between conduits 32 and 33. With the conduits 32 and 33 in communication, the discharge area of the pump 13 is increased so as to reduce the resistance of flow through the system and the pressure becomes a true index of the speed of the turbine. As the temperature of the fluid within the reservoir 20 and the fluid pressure system increases, the viscosity decreases and the film between the shaft 19 and the sleeve or bearing member 21 becomes capable of transmitting less and less torque. As the torque transmitted to the sleeve or bearing member 21 decreases, the spring 22 gradually moves the lever arm 24 upwardly and moves the valve member 31 in a closing direction. When the fluid has reached its normal temperature and viscosity, communication between conduits 32 and 33 is entirely cut off and fluid is discharged solely through the orifice 18 to the reservoir 20.

It will be apparent from the foregoing that I have devised and improved means for compensating for variations in viscosity of fluid in a fluid pressure system.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a fluid pressure system, the combination of means for developing pressure of fluid varying with the driving speed thereof, and means responsive to the viscosity of the fluid for rendering the pressure of the fluid in the system independent of its viscosity.

2. In a fluid pressure system, the combination of means for developing pressure of fluid varying with the driving speed thereof, and means responsive to the viscosity of the fluid for partially relieving the pressure to compensate for variations in viscosity of the fluid.

3. In a fluid pressure governing system for a machine, the combination of a positive displacement pump delivering a quantity of fluid proportional to the speed of the machine, a restricted orifice for discharging the fluid delivered by the pump, means responsive to the viscosity of the fluid in the system for providing additional discharge opening to compensate for variations in viscosity, and a governor responsive to the pressure in the system.

4. In a pressure fluid circulating system employing a fluid of varying viscosity as the pressure medium and wherein the pressure in the system tends to vary with the viscosity of the fluid, the combination of a pump for developing pressure for the system, a shaft driven in synchronism with the pump, a sleeve surrounding the shaft, means supplying a continuous flow of fluid between the sleeve and the shaft, valve controlled means for compensating for varying viscosity of the fluid, and means responsive to the torque of the sleeve for operating the valve means.

5. The combination of a prime mover, a fluid pressure operated governor for the prime mover, a pump driven by the prime mover, a delivery conduit leading from the pump to the governor, valve controlled means communicating with the conduit for imposing a back pressure on the fluid in the conduit, a shaft rotating in synchronism with the pump, a sleeve surrounding the shaft, means for circulating fluid from the pump between the sleeve and the shaft, resilient means connected to the sleeve and a stationary member for resisting the torque of the sleeve, and an operating connection between the sleeve and the valve controlled means.

6. In combination, in a fluid pressure system, wherein a fluid of varying viscosity is employed as the pressure medium, a positive displacement pump for developing fluid pressure for the system, valve controlled means for imposing a back pressure on the fluid in the system, a shaft rotating in synchronism with the pump, a bearing member surrounding the shaft, means for continuously supplying the bearing member with fluid from the system, resilient means resisting turning of the bearing member with the shaft, and an operative connection between the bearing member and the valve means.

7. The combination with a prime mover having an admission valve and a fluid pressure operated governor for controlling the admission valve, of a gear pump for delivering fluid pressure for operating the governor, a delivery conduit from the pump to the governor, an orifice of constant area in the delivery conduit, a valve connecting with the conduit for further increasing the discharge area of the pump, a shaft rotating in synchronism with the pump, a bearing member surrounding the shaft and loosely mounted thereon, means for supplying fluid from the conduit to the bearing member, a spring for resisting turning of the bearing member with the shaft, a lever arm connected to the bearing member, and an operative connection between the lever arm and the valve.

8. In a fluid pressure system, wherein the pressure medium is of varying viscosity and the pressure of the system tends to vary with the viscosity of the fluid, means for developing pressure of fluid in said system, means for compensating for variations of viscosity in the fluid comprising a rotating shaft, a bearing member surrounding the shaft and loosely mounted with respect thereto, means supplying a film of fluid from the system between the bearing and the shaft, a valve for bleeding fluid from the system, and means responsive to the torque of the bearing member for operating the valve.

9. A viscosity compensating device for fluid pressure systems comprising a rotary member, a sleeve surrounding the rotary member, means providing a film of fluid from the system between the rotary member and the sleeve, and means responsive to the torque of the sleeve for varying the flow of fluid through the system.

10. In a fluid circulating system wherein the resistance to flow of fluid through the system varies with the viscosity of the fluid, valve means adapted to increase the flow area through the system, relatively movable members in rubbing contact with each other, means supplying fluid from the system between the relatively movable members, and means responsive to resistance to relative movement between said members for operating the valve means.

11. The combination with an elastic fluid turbine having a fluid pressure operated governor for controlling the speed thereof, of a positive displacement pump for developing fluid pressure for operating the governor, means providing a continuous flow of fluid from the pump, valve means adapted to increase the flow area from the pump, relatively movable members in rubbing contact with each other, means supplying fluid from the pump between the movable members, and means actuated by energy transmitted from one of the relatively movable members to the other for operating the valve means.

12. The combination with an elastic fluid turbine having a fluid pressure operated governor for controlling the speed thereof, of a positive displacement pump for developing fluid pressure for operating the governor, means providing a continuous flow of fluid from the pump, valve means adapted to increase the flow area from the pump, relatively rotatable members in rubbing contact with each other, means supplying fluid from the pump as a lubricant between the members, and power transmitting mechanism movable in response to the resistance to relative movement between the members for operating the valve means.

In testimony whereof, I have hereunto subscribed my name this twenty-fifth day of September, 1925.

HENRY F. SCHMIDT.